Figure 1:
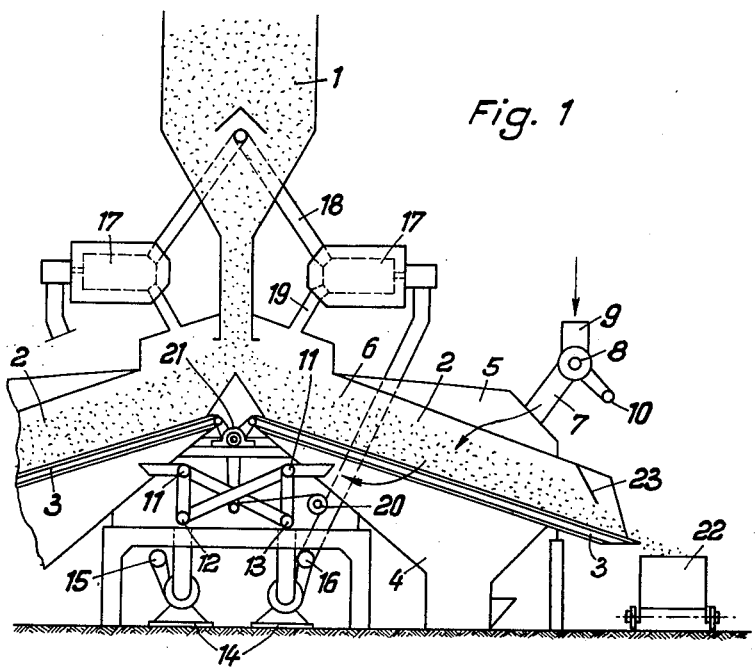

Jan. 25, 1955

O. HUBMANN 2,700,596

PROCESS AND APPARATUS FOR THE LOW-TEMPERATURE CARBONIZATION
AND GASIFICATION OF COMBUSTIBLES

Filed March 31, 1950

Inventor:
OTTO HUBMANN
By Bailey, Stephens & Huettig
ATTORNEYS

United States Patent Office 2,700,596
Patented Jan. 25, 1955

2,700,596

PROCESS AND APPARATUS FOR THE LOW-TEMPERATURE CARBONIZATION AND GASIFICATION OF COMBUSTIBLES

Otto Hubmann, Bad Homburg, Germany

Application March 31, 1950, Serial No. 153,032

Claims priority, application Germany
October 28, 1949

12 Claims. (Cl. 48—78)

The invention relates to a process and an apparatus for the low-temperature carbonization and gasification of combustibles.

Solid combustibles containing relatively large amounts of ashes, like oil-shale, tailings from coal dressing, coal rich in ashes, or the like, have been gasified before while being passed through an inclined chamber in a layer of approximately 1 to 2 m. thickness, by air and steam drawn through the layer by suction from above downward while simultaneously tar and light oils were produced. It has been found, however, that with higher ash-contents very often difficulties occurred by heavy clinkering arising in the fuel-bed, since the gasification means were very highly preheated in the burnt-out residue so that despite the low carbon content very high combustion temperatures were produced. It has further been tried to reduce the temperatures by recirculating gas to the fuel-bed. Hereby an advantage was attained with regard to the clinkering, but a portion of the recycled combustible gas was burnt with the simultaneously introduced oxygen with the consequence that the heat economy of the process was impaired considerably. Furthermore, the calorific value of the produced gases was reduced by the partial combustion to such an extent that when operating with combustibles rich in ashes the produced gases were not utilizable in most cases. It is an object of the present invention to prevent clinkering and to utilize at the same time the heat accumulating in the residue for the production of combustible gases. Another object of the invention is to increase the calorific value of the produced gas, thus facilitating to quite an extent its utilization. A further object consists in producing part of the gases with a particularly high calorific power so as to make it usable for special purposes, while the other part of the gases, which are lower in calorific power, may be utilized for supplying the necessary heat for the process including the heat for the drying and the distillation of the combustible. Still another object of the invention is to produce from combustibles rich in ashes gases rich in hydrogen that may be used, for example, for the synthesis of ammonia or the hydrogenation of tars or for supplying industries and residences with gas of high calorific value.

According to the invention two or more inclined chambers through which the combustibles travel are operated in such a way that oxidizing gases as, for example, air, are introduced into the combustible in one chamber or group of chambers, while simultaneously reducible gases as, for example, steam, or the gas produced in another group of chambers which, if the occasion requires, may be mixed with steam or carbon dioxide, are introduced into a second chamber or group of chambers, and that the chambers are operated alternately in short periods with oxidizing and with reducible gases.

For example, in the process according to the invention two or more inclined chambers are connected to a common feed hopper, which may also be used for drying and preliminary distillation of the solid combustible afterwards treated in the chambers. Gases rich in oxygen are alternately introduced from above and led through or, for example, drawn by suction through the layer of combustibles in one chamber or group of chambers, if there are a greater number of them, while simultaneously another chamber or group of chambers is supplied with gas poor in or free from oxygen, as, for example, steam or recycled gas from the furnace itself, which on account of its contents of carbon dioxide and steam are partly reduced and act as heat absorbing means, so that the residues are cooled effectively under formation of combustible gases. If the alternate supply of the two gases to the two chambers or groups of chambers in accordance with the invention is changed over within short periods of time, a period of rising temperature in the fuel-bed, caused by the introduction of oxidizing gases rich in oxygen, is followed by a strongly cooling period caused by the use of gasification means free of or poor in oxygen but containing carbon dioxide and steam with the result that the undesirable clinkering in the fuel-bed is eliminated.

In this case gas produced by the process, increased, if necessary, by steam and possibly also carbon dioxide, may be returned to the fuel-bed without occasioning any danger of a combustion of this gas. Moreover, the degree of decomposition of the steam and the carbon dioxide is considerably increased, thus effecting a substantial saving in steam.

If, according to another way of carrying-out the invention, the gases produced in the separate chambers during the reducing period are withdrawn separately from those produced in the oxidizing period, it becomes possible to produce in the gas-reducing period gases higher in calorific value than those produced with air in the oxidizing period. The gases with higher calorific value may be suitable for special purposes, as, for instance, the production of energy in internal combustion engines, while the gases with lower calorific power may be utilized for the process itself as, for example, for drying and preliminary distillation of the combustible in the known way. (French Patent 894,889).

With combustibles sufficiently rich in carbon as, for instance, more than 10% of the dry substance, the process according to the invention may also be used for the production of gases rich in hydrogen and poor in nitrogen, which may be suitable, for example, for the synthesis of ammonia or hydrocarbons. For this purpose, in accordance with the invention, alternately air and steam, to which latter a limited quantity of air may be added in case the gas is to be used for the synthesis of ammonia, are fed to the different chambers and the gas produced from the steam is withdrawn separately. In this case it may be expedient, in a similar way as with the production of water gas in a shaft furnace, to operate during the two periods of blowing with air and gassing with steam with different lengths of the periods and with different gas speeds in the fuel-bed. Compared with the shaft gas producer the process according to the invention has the advantage of a continuous production of water gas due to the use of several chambers. The regenerator used with the known watergas producers is replaced in this new process by the accumulation of heat in the hot residue. In order to increase the heat accumulation in the residue of the combustible still further, so as to effect a stronger heating of the gasification-steam, combustible gases may be added to the combustion air during the blowing period as, for example, by recirculating the gas generated during the blowing period. In this way an additional heating of the residue with waste gas is effected as well as a higher yield of usable gas rich in hydrogen.

With combustibles of a lower ash content part of the ashes are expediently brought back to the chamber for the purpose of increasing the capacity for heat accumulation of the residue. On the other hand, when operating with combustibles rich in ashes, and especially if water-gas is produced, the carbon content of the combustible may be increased by an addition of combustibles richer in carbon.

A suitable apparatus for operating the process in accordance with the invention comprises advantageously a feed hopper, which may be provided in the known way with devices for drying and preliminary heating the combustible, and several as, for instance, four to ten, inclined chambers, which are connected to the lower end of the hopper and in which the combustible is continuously or intermittently conveyed downward on wholly or partly movable bottoms of known construction provided with perforations for the passage of the gases. The chambers may be arranged in one direction or, according to another form of the invention, in two opposite directions, in which case the movable bottoms of the chambers are connected with each other by hinges and moved by a common drive. In this way an extensive compensation of the forces necessary for the drive is achieved, and in addition the danger that gases flow from the gasification chambers to the feed hopper or in the reverse direction is considerably lessened, since due to the chambers extending toward two opposite sides the combustible may be fed through a common duct whereby the gas losses are only half as large as with the chambers extending from one side.

For the purpose of subdividing the entire fuel-bed extending from the feed hopper—into the desired number of chambers vertical water-cooled walls extending in the direction of the movement of the combustible through the chambers are provided in corresponding numbers. In this way a number of separate chambers are produced, which may be operated alternately according to the method of the invention.

In order to provide the chambers with a connection to the feed lines for air and gas a covering is provided above the chambers. The lines opening into this cover are fitted with change-over devices as, for example, flaps or slide valves, by means of which the lines may alternately be connected with a main line for air or a main line for gas poor in oxygen as, for instance, recycled gas or steam. In case the produced gases are to be used separately or, if especially high-grade gases are to be produced as, for example, water gas, the space below the fuel-bed is also subdivided by partitions matching the subdividing walls of the chambers, and the individual gas chambers are connected with the main lines for the two kinds of gases via change-over valves.

Figure 2:
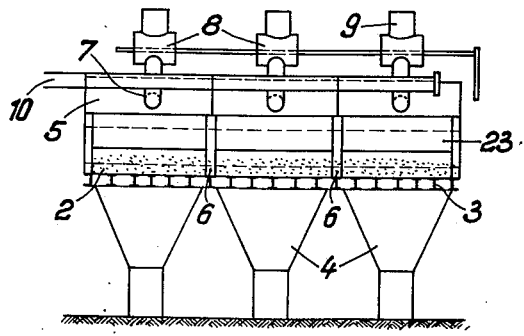

An apparatus for carrying-out the invention is illustrated by way of example in Figs. 1 and 2, of which Fig. 1 shows a vertical cross-section of a furnace with chambers extending to two opposite sides, while Fig. 2 shows a side-elevation of three chambers of one of the sides. Connected to hopper 1 are two groups of inclined chambers 2 extending in opposite directions. These inclined chambers are fitted with wholly or partly movable bottoms 3. Below the chambers are arranged the gas receiving chambers 4. The chambers are closed on top by covers 5 and partitioned by vertical water-cooled walls 6 extending upward to the cover 5. Feed-lines 7 leading to the cover of the chambers are provided with change-over devices 8 of known construction for the purpose of alternately connecting the chambers either with the open air by means of sockets 9 or with the steam-line 10. The gas chambers 4 below the chambers 2 are in the described way connected via the change-over valves 11 to the two collecting lines for the produced gas 12 and 13, out of which the two kinds of gases are forced into the service lines 15 and 16 by means of blowers 14. Through line 16 gas is fed to the combustion furnace 17, and the generated combustion gas is fed via line 18 partly to the hopper 1 for the purpose of drying the combustible and partly via line 19 to the fuel-bed for the purpose of preliminary degasification and ignition of the combustible in the chambers. The movement of the bottoms 3 of the chambers is effected by a drive 20 of usual construction, the bottoms 3 on the one side of the plant being pivotally connected with the bottoms 3 on the other side by a common lever 21. The movement of the bottoms by means of this lever causes the combustible to be moved downward through the chambers, at the lower ends of which it falls as residue into the conveying device as, for example, a trolley 22. For the purpose of preventing air from entering at the lower ends of the chambers flaps 23 are provided, the loose ends of which rest movably on the residue.

The described apparatus may be operated in the following manner:

The lower parts of the inclined chambers 2 are first filled with burnt-out ashes, while the upper part of the chambers and the hopper 1 are filled with the combustible to be gasified as, for example, oil shale or coal with a large content of ashes, which expediently has been reduced to a maximum grain-size of 80 to 100 mm. by sieving or crushing. The combustion furnace 17 is now started by means of foreign gas and air, and the hot combustion gas is fed via line 18 to the hopper 1 and via line 19 to the upper part of the chambers. The combustible in the hopper is dried and preheated in this way, while the combustible in the upper part of the chambers is heated to ignition temperature of about 300 to 400° C. and set on fire on the surface by oxygen present in the hot combustion gas. The temperature in the hopper is controlled in a known way by recirculation of a portion of the combustion gases that have been cooled by passing through the charge of the hopper, while the remainder of these gases is discharged from the hopper through a chimney or the like. As soon as the combustible in the chambers is ignited the blowers 14 are started, which suck the gases downward through the bottoms of the chambers. Subsequently the movable grates 3 are set in motion and the combustible begins to move slowly. In this way a combustion and gasification zone gradually spreads over the entire chamber. The burnt-out ashes finally reach the lowest part of the chambers and are discharged into the trolley 22. The gas, which at the beginning of the operation is low in calorific value, soon becomes combustible as the combustion zone extends to the lower ends of the chambers. By means of accelerating the movement of the combustibles in the chambers and by increasing the air-suction through line 9 as well as by intensifying the heating of the combustion furnace 17 the output capacity of the apparatus is now increased, whereby at the same time an improvement of the calorific value of the produced gas is achieved. Any surplus gas may be utilized for other heating purposes or the like. With combustibles poor in carbon only gas of low grade can be produced with this known way of operating, and on account of the danger of clinkering only a relatively small output capacity is possible.

For the purpose of increasing the output capacity and in order to produce a gas with higher calorific value the plant is now changed, according to the object of the invention, to alternate operation of the different chambers. For this purpose by way of example the three chambers on the right-hand side of the furnace are operated by drawing-in air by suction via the change-over valve 8, while simultaneously the three left-hand chambers of the furnace are operated with steam fed via line 10. The discharge of the gases from the chambers is effected with the aid of the change-over valve 11 in such a way that the gas produced by means of air leaves via the collecting lines 13 and 16, while simultaneously the preponderantly hydrogen containing gas produced by means of steam is withdrawn via lines 12 and 15. By means of a simultaneous periodical reversal of the change-over valves 8 and 11 alternately air and steam is fed to each group of chambers, and the gases produced in each group of chambers are in the same way alternately discharged via the lines 13 and 12. During, for example, five minutes the right-hand half of the furnace is blown with steam, and the left-hand half of the furnace is operated by drawing-in air by suction. In this period the gas produced in the right-hand half is drawn off through the line 15 and the gas produced in the left-hand half of the furnace is drawn off through the line 16. Then the change-over valves 8 and 11 are reversed. Now the gas from the left-hand chambers passes to line 15 and the gas from the right-hand chambers to line 16. After further five minutes this changing-over is repeated and the repetitions of changing-over are followed by each other in uniform periods. A high-grade gas is now disposable in line 15, while in line 16 a gas lower in calorific value is accumulated and used for combustion in the furnace 17 for heating the plant itself or the like.

Due to the considerable decrease of the combustion temperature in the fuel-bed, which is obtained by the process according to the invention, the danger of clinkering is eliminated and the plant can be operated with a considerably increased output capacity. If only a good heating gas is required or if, for example, for metallurgical purposes hydrogen-containing gas is not desired, recycled gas or carbon-dioxide may be fed to the chambers instead of steam. On account of the reduction of the carbon dioxide and the additionally absorbed volatile constituents from the combustible the gas produced in this way has a higher calorific power than the gas produced directly by means of air. By alternately introducing recycled gas or carbon dioxide through the fuel-bed the cooling influence on the fuel-bed may be achieved in practically the same way as with the introduction of steam.

When operating with oil-shale, bituminous coal or the like the usual devices for separating the hydrocarbons or the like from the produced gases may be provided.

In case water-gas for synthesis purposes is to be produced and for this purpose unequal periods of feeding the different gasification means to the chambers are to be employed, it is expedient to supply alternately, for example, two of the existing six chambers simultaneously with air, while four chambers are operated with steam. In this way it becomes possible to operate the fuel-bed, for example, two minutes with air (blowing period), and subsequently four minutes under low load with steam (gassing period), in a similar way as the process used with water-gas producers.

In order to increase the yield of gases rich in hydrogen with the process according to the invention gaseous or liquid hydrocarbons as, for example, tar or waste gases taken out of the process itself e. g. from a hydrocarbon synthesis or the like, may be admixed with the reducible gasification means. The admixed substances are hereby preponderantly reduced to hydrogen.

The present invention provides a solution of the problem of gasification under reliable operating conditions of combustibles with a strong tendency toward clinkering and particularly combustibles rich in ashes, whereby large portions of the combustibles are obtained in the shape of liquid hydrocarbons and high-grade gas, while formerly one had to be satisfied with recovering products of low-temperature carbonisation, and under unfavorable circumstances one even had to use foreign combustibles for heating the plant.

What I claim is:

1. A process for the distillation and gasification of solid fuel which comprises introducing said fuel into a gas generator, igniting such fuel and passing it while supported upon inclined gas permeable fuel grates downwardly through the generator in a plurality of adjacent downwardly inclined parallel inclined streams which are separated from each other to provide a plurality of separate parallel downwardly moving inclined fuel beds in such generator, passing oxygen-containing gas downwardly through at least one of such fuel beds in a direction transverse to the flow thereof while simultaneously and separately passing a substantially oxygen-free gas downwardly through at least one of the other fuel beds in a direction transverse to the flow thereof, periodically exchanging a substantially oxygen-free gas for the oxygen-containing gas and an oxygen-containing gas for the substantially oxygen-free gas passed through such beds, withdrawing a substantially constant flow of the gases produced from below the fuel beds the gases produced by the oxygen containing and the substantially oxygen free gases upon passage through the fuel beds being withdrawn separately, and discharging the fuel residues supported upon the grates at the lower end of the grates over the lower ends of the grates.

2. A process in accordance with claim 1, in which said oxygen-containing gas is air and said substantially oxygen-free gas comprises steam.

3. A process in accordance with claim 1, comprising in addition recycling a portion of the ashes produced to said fuel beds.

4. A process in accordance with claim 1, in which hydrocarbons are admixed with said substantially oxygen-free gas.

5. A process in accordance with claim 1, in which said fuel is a fuel rich in ashes.

6. A process in accordance with claim 1, in which said fuel is oil shale.

7. A process in accordance with claim 1, in which said fuel is composed of tailings from the dressing of coal.

8. A process in accordance with claim 1, comprising in addition preheating the fuel and igniting the fuel with at least a portion of the gases resulting from the passage of the oxygen-containing gas downwardly through at least one of the fuel beds.

9. A process in accordance with claim 1, in which said oxidizing gas is air and said reducing gas is recycled gas from the oxidizing run.

10. An apparatus for the distillation and gasification of solid fuel comprising a chamber containing at least two downwardly extending inclined adjacent parallel gas permeable fuel grates adapted to receive and transport fuel beds downwardly upon their inclined surfaces, partition means subdividing the space in the chamber above the grates into a plurality of chambers to provide an individual chamber over each grate separated from the chamber of the adjacent grate, partition means in the space below the grates subdividing such space into a plurality of chambers corresponding to those above the grates to provide an individual chamber below each grate separated from the chamber of the adjacent grate, means for supplying fuel to the upper ends of said grates from a common hopper, means for igniting the fuel, a feed line for a gas of one composition, a feed line for a gas of different composition, means for simultaneously introducing gas from one feed line into at least one of said individual chambers above the grates and gas from the other feed line into at least another of said individual chambers above the grates, and means for alternately changing the gas introduced into the individual chambers above the grates to the gas from the other feed line, means for separately withdrawing the gases produced from the individual chambers below the grates and discharge means in the chambers above the individual grates adjacent the lower ends of the inclined grates for discharging the fuel residues accruing on such lower ends.

11. An apparatus in accordance with claim 10, in which said partition means in the space above the grates are water-cooled walls.

12. An apparatus for the distillation and gasification of solid fuel comprising a chamber containing two groups of downwardly inclined oppositely extending gas permeable fuel grates adapted to receive and transport fuel beds downwardly on their inclined surfaces, each group comprising at least two adjacent downwardly extending parallel inclined fuel grates, partition means in the space below the grates subdividing such space into a plurality of chambers corresponding to those above the grates to provide an individual chamber below each grate separated from the chamber of the adjacent grate, partition means subdividing the space in the chamber above the grates into a plurality of chambers to provide an individual chamber over each grate separated from the chamber of the adjacent grate, means for supplying fuel to the upper ends of said grates from a common hopper, means for igniting the fuel, a feed line for a gas of one composition, a feed line for a gas of different composition, means for simultaneously introducing gas from one feed line into at least one of said individual chambers above the grates and gas from the other feed line into at least another of said individual chambers above the grates and means for alternately changing the gas introduced into the individual chambers above the grates to the gas from the other feed line, means for separately withdrawing the gases produced from the individual chambers below the grates and discharge means in the chambers above the individual grates adjacent the lower ends of the inclined grates for discharging the fuel residues accruing on such lower ends.

References Cited in the file of this patent

UNITED STATES PATENTS

| Number | Name | Date |
| --- | --- | --- |
| 268,671 | Hetfield | Dec. 5, 1882 |
| 1,068,694 | Mewport | July 29, 1913 |
| 1,207,262 | Alwart | Dec. 5, 1916 |
| 1,832,092 | Burnside | Nov. 17, 1931 |
| 1,972,833 | Subkow | Sept. 4, 1934 |
| 2,035,600 | Frankl | Mar. 31, 1936 |
| 2,094,946 | Hubmann | Oct. 5, 1937 |
| 2,374,808 | Edwards | May 1, 1945 |